United States Patent Office 2,971,031
Patented Feb. 7, 1961

2,971,031

PREPARATION OF LIQUID ALKYLATED PENTABORANE-9

George E. Ryschkewitsch, Columbus, Ohio, assignor, by mesne assignments, to Olin Mathieson Chemical Corporation, a corporation of Virginia No Drawing. Filed Nov. 2, 1955, Ser. No. 544,594

10 Claims. (Cl. 260—606.5)

This invention relates to the manufacture of liquid alkylated pentaboranes and, in particular, to the alkylation of pentaborane with olefins of 2 to 5 carbon atoms in the presence of an alkylation catalyst which is pyridine, a lower alkyl pyridine or a mixture thereof. The preparation and manner of using liquid alkylated pentaboranes is described in Altwicker, Garrett, Weilmuenster and Harris application Serial No. 497,408, filed March 28, 1955.

Pentaborane may be prepared by methods which are described in the art; it is a colorless liquid which melts at −46.8° C. The boron hydrides, and pentaborane in particular, because of their high heats of combustion, have been recognized as materials which are potentially of value as high energy fuels. The burning of these materials with oxygen liberates considerably more energy than the oxidation of a corresponding amount of hydrocarbon, producing very high flame temperatures. Pentaborane suffers from several disadvantages: (1) it has a very disagreeable odor; (2) it has a relatively high vapor pressure; its vapor pressure being 66 mm. of mercury at 0° C. and its boiling point at atmospheric pressure being 58° C.; and (3) its vapors are highly toxic.

One of the objects of this invention is to provide a method for producing high energy liquid products less volatile and less toxic than pentaborane but at the same time approaching pentaborane in heat of combustion. In accordance with the present invention it has been discovered that pentaborane can be reacted with monoolefins containing from 2 to 5 carbon atoms in the presence of an alkylation catalyst which is pyridine, a lower alkyl pyridine or a mixture thereof to form alkylated pentaboranes which are stable, relatively non-volatile liquids with convenient handling characteristics. By this process olefins, which are available at relatively low cost in large tonnages, are reacted with pentaborane in the presence of catalysts to form valuable alkylated pentaboranes in yields substantially greater than those obtained when olefins and pentaborane are reacted under the same conditions without the use of these catalysts.

The following example illustrates an embodiment falling within the scope of my invention and is to be considered not limitative. In the example, the term "moles" means gram moles unless otherwise specified.

*Example*

In this experiment 0.080 millimole of pyridine was condensed into a 60 ml. glass bulb which was immersed into a Dewar flask filled with liquid nitrogen (temperature −196° C.). Then 10.29 millimoles of isobutylene, followed by 10.10 millimoles of pentaborane-9, were condensed into the bulb at the same temperature. At this temperature the reactants were solids. The bulb was sealed, removed from the cooling flask, allowed to warm to room temperature and then heated for 7½ hours at 150° C. in a Fisher Isotemp oven. After being removed from the oven, the bulb was allowed to cool to room temperature and then attached to a vacuum line. In the next step it was cooled with liquid nitrogen, and opened to the vacuum line.

A part of the crude product in the bulb was allowed to warm up and was fractionated through a series of cold traps. In the first instance the material was allowed to pass through three traps, the first being held at −78° C., the second at −116° C. and the third at −196° C. Through a series of additional fractionation operations carried out with cold traps, unreacted pentaborane-9 was finally isolated in the −78° C. trap and the hydrocarbon fraction in a −196° C. trap. The hydrocarbon fraction in the −196° C. trap was analyzed in standard gas analysis equipment and was shown to contain 0.56 millimole of isobutane and 3.99 millimoles of isobutene. The quantity of unreacted pentaborane-9 caught in the −78° C. trap was 8.44 millimoles.

The remaining material in the bulb was fractionated through a series of four cold traps held at −8.0° C., −18° C., −45° C. and −78° C., respectively. In the trap held at −45° C. a fraction was obtained which exhibited a vapor pressure of 6.0 mm. at 26° C. This material was refractionated through three traps held at −8° C., −18° C. and −78° C., respectively, and in the −78° C. trap a material was collected which had a vapor pressure of 6 mm. of Hg at 26° C.; this vapor pressure corresponds closely with the vapor pressure of tert-butylpentaborane. The weight of tert-butylpentaborane collected in the −45° C. trap was 0.67 millimole. The yield of tert-butylpentaborane was 40.4 percent based on the pentaborane used in the reaction. The remainder of the pentaborane-9 consumed was transformed into tri-tert-butylborane and other viscous liquids containing carbon which were not volatile at room temperature. The amount of tri-tert-butylborane formed in the reaction was 0.85 millimole.

Various modifications can be made in the procedure of the specific example to provide other embodiments which fall within the scope of my invention. Thus, in place of the isobutylene used, there can be substituted other monoolefin hydrocarbons containing from 2 to 5 carbon atoms for example, ethylene, propylene, 1-butene, 2-butene, 1-pentene, 2-pentene, 2-methyl-2-butene and the like. Also, in place of the pyridine, there can be substituted lower alkyl pyridines, generally those containing a total of not more than 4 carbon atoms in the alkyl radicals, for example, alphapicoline, betapicoline, gammapicoline, 3,5-dimethyl pyridine, 2,5-dimethyl pyridine, 2,4,6-trimethyl pyridine, 2,4,5-trimethyl pyridine, 2,3,6-trimethyl pyridine, and the like. The relative amounts of the various materials introduced into the reaction zone can be varied widely, as can also the reaction temperature. The ratio of olefin to pentaborane utilized in carrying out the reaction will generally vary from about 0.1 to 10 moles of the olefin per mole of pentaborane, the preferred range being from 0.5 to 2.0 moles of olefin per mole of pentaborane, depending upon the degree of alkylation desired. The quantity of pyridine or equivalent used will generally range from 0.001 to 0.05 mole per mole of pentaborane. The reaction temperature will usually be within the range from about 130 to 190° C., preferably from 140 to 155° C. Also, the reaction time can be varied widely, usually from 1 to 24 hours or more, but preferably from 4 to 8 hours.

I claim:

1. A method for the preparation of liquid alkylated pentaborane-9 which comprises reacting pentaborane-9 with from 0.1 to 10 moles, per mole of pentaborane-9 of a monoolefin hydrocarbon containing from 2 to 5 carbon atoms at a temperature within the range from 130° to 190° C. while they are in admixture with a catalytic amount of a material selected from the group consisting of pyridine and lower alkyl pyridines.

2. A method according to claim 1 wherein said monoolefin hydrocarbon is ethylene.

3. A method according to claim 1 wherein said monoolefin hydrocarbon is propylene.

4. A method according to claim 1 wherein said monoolefin hydrocarbon is isobutylene.

5. A method according to claim 1 wherein said material is pyridine.

6. A method for the preparation of liquid alkylated pentaborane-9 which comprises reacting pentaborane-9 and from 0.5 to 2 moles, per mole of pentaborane-9, of a monoolefin hydrocarbon containing from 2 to 5 carbon atoms at a temperature within the range from 140° to 155° C. while the reactants are in admixture with from 0.001 to 0.05 mole, per mole of pentaborane-9, of a material selected from the group consisting of pyridine and lower alkyl pyridines.

7. A method according to claim 6 wherein said monoolefin hydrocarbon is ethylene.

8. A method according to claim 6 wherein said monoolefin hydrocarbon is propylene.

9. A method according to claim 6 wherein said monoolefin hydrocarbon is isobutylene.

10. A method according to claim 6 wherein said material is pyridine.

References Cited in the file of this patent

Hurd: J. Amer. Chem. Soc. 70, pp. 2053–55 (1948). (Copy in the Patent Office Library.)